United States Patent
Al-Garni et al.

(10) Patent No.: US 8,083,902 B2
(45) Date of Patent: Dec. 27, 2011

(54) EVAPORATIVE DESALINATION SYSTEM

(75) Inventors: Ahmed Z. Al-Garni, Dhahran (SA);
Ayman H. Kassem, Dhahran (SA);
Wael G. Abdelrahman, Dhahran (SA)

(73) Assignee: King Fahd University of Petroleum and Minerals, Dharah (SA)

( * ) Notice: Subject to any disclaimer, the term of this patent is extended or adjusted under 35 U.S.C. 154(b) by 0 days.

(21) Appl. No.: 12/801,154

(22) Filed: May 25, 2010

(65) Prior Publication Data
US 2011/0139599 A1    Jun. 16, 2011

(51) Int. Cl.
  *B01D 1/14* (2006.01)
  *B01D 1/30* (2006.01)
  *C02F 1/14* (2006.01)
  *F28F 13/00* (2006.01)

(52) U.S. Cl. .......... 202/234; 159/14; 159/15; 159/26.2; 159/903; 165/48.2; 165/146; 202/185.3; 202/266; 203/10; 203/100; 203/DIG. 1; 203/DIG. 17; 60/641.9

(58) Field of Classification Search ............ 159/14, 159/15, 26.2, 903, DIG. 1, DIG. 23, DIG. 40; 202/185.3, 234, 266; 203/10, 100, DIG. 1, 203/DIG. 17; 165/67, 48.2, 146, 179; 60/641.9
See application file for complete search history.

(56) References Cited

U.S. PATENT DOCUMENTS

| | | | |
|---|---|---|---|
| 102,633 A | 5/1870 | Wheeler et al. | |
| 2,038,002 A * | 4/1936 | Ris | 165/116 |
| 2,141,330 A | 12/1938 | Abbot | |
| 3,501,381 A | 3/1970 | Delano | |
| 4,270,981 A | 6/1981 | Stark | |
| 4,440,861 A * | 4/1984 | McCarthy | 435/289.1 |
| 4,525,242 A | 6/1985 | Iida | |
| 4,606,794 A | 8/1986 | Wyckoff | |
| 5,094,721 A * | 3/1992 | Petrek | 203/22 |
| 5,316,626 A | 5/1994 | Guy | |
| 5,492,602 A | 2/1996 | Vogelman et al. | |
| 5,628,879 A * | 5/1997 | Woodruff | 202/234 |
| 6,050,327 A * | 4/2000 | Gates | 165/80.3 |
| 7,381,310 B2 | 6/2008 | Hernandez Hernandez et al. | |
| 7,416,643 B2 | 8/2008 | Yonover | |
| 7,435,317 B2 | 10/2008 | Hata | |
| 7,494,572 B2 * | 2/2009 | Tonkin et al. | 203/10 |
| 7,527,711 B2 | 5/2009 | Ciudaj | |
| 2007/0193870 A1 | 8/2007 | Prueitt | |
| 2008/0083604 A1 | 4/2008 | Al-Garni et al. | |

FOREIGN PATENT DOCUMENTS

| | | |
|---|---|---|
| DE | 202004017383 U1 | 1/2005 |
| DE | 102007055448 A1 | 5/2009 |
| EP | 1923354 A2 | 5/2008 |

* cited by examiner

*Primary Examiner* — Virginia Manoharan
(74) *Attorney, Agent, or Firm* — Richard C. Litman

(57) ABSTRACT

The evaporative desalination system removes salt and contaminants from brine or salt water to produce purified potable water. The evaporative desalination system includes an inclined housing having a raised upper end and a lower end. An upper wall of the inclined housing is formed from an optically transparent material, such as glass. A plurality of stepped evaporator trays are mounted within the inclined housing, and a water collection tray is disposed within the inclined housing adjacent the lower end. Ambient light is transmitted through the optically transparent upper wall, causing the salt water contained within the plurality of stepped evaporator trays to evaporate. Evaporated water vapor rises from each evaporator tray to form a layer of condensed pure water on the inner surface of the upper wall. The condensed pure water drips toward the lower end of the inclined housing to collect in the water collection tray.

15 Claims, 6 Drawing Sheets

EVAPORATIVE DESALINATION SYSTEM

BACKGROUND OF THE INVENTION

1. Field of the Invention

The present invention relates to desalination systems, and particularly to an evaporative desalination system that produces a substantially uniform density of condensed water vapor on the condensation surface.

2. Description of the Related Art

Recently, great interest has been focused on the technique of desalinating seawater by using solar energy. FIG. 6 is a schematic view of a conventional desalination apparatus 100 that uses solar energy, which is commonly known as a "basin-type solar heat distiller". The desalination apparatus 100 has a basin 102 for holding raw water W (e.g., sea water) and an air shield 103 that covers the basin 102 and is permeable to sunlight S. The outer surface of the air shield 103 is used as a radiating part 106. In the desalination apparatus 100 of FIG. 6, the raw water W in the basin 102 is heated with sunlight S to generate water vapor 105. The water vapor 105 is cooled and condensed on the inner surface of the air shield 103, and thus distilled water 107 is obtained.

In the simplified diagram of FIG. 3, a conventional tray T holds the raw water W, the evaporated water condensing on a generalized condensing surface C. FIG. 3 illustrates the disparity between the differing heights $H_1$ and $H_2$ between the surface of water W and the different locations on the condensing surface C in a more dramatic fashion than FIG. 6. This exaggeration is provided to illustrate the differences between the density of condensed water vapor $CW_1$ (formed at height $H_1$) and the density of condensed water vapor $CW_2$ (formed at height $H_2$). The density of $CW_2$ is much greater than $CW_1$ due to the relatively small distance of travel of the evaporated water. It would be desirable to provide a desalination system in which the density of water vapor condensation on the condenser surface is substantially equivalent across the entire surface area of the condenser surface.

Thus, an evaporative desalination system solving the aforementioned problems is desired.

SUMMARY OF THE INVENTION

The evaporative desalination system removes salt and contaminants from brine or salt water to produce purified potable water. The evaporative desalination system includes an inclined housing having a raised upper end and a lower end. The inclined housing defines a sealed open interior region therein. An upper wall of the inclined housing is formed from an optically transparent material, such as glass or the like.

A plurality of stepped evaporator trays are mounted within the inclined housing so that the vertical distance between each evaporator tray and an inner surface of the upper wall is approximately equal. A water collection tray is also mounted within the inclined housing adjacent the lower end thereof.

An external pump, which is selectively actuated, is positioned adjacent the inclined housing for selectively feeding the brine or salt water from an external source into the evaporator trays. A feed pipe is connected at one end to the pump, and the other end of the feed pipe feeds the brine or salt water into the open interior region of the inclined housing to selectively fill the evaporator trays.

Ambient light, such as sunlight, is transmitted through the optically transparent upper wall, causing the salt water contained within the plurality of stepped evaporator trays to evaporate. Evaporated water vapor rises from each evaporator tray to form a layer of condensed pure water on the inner surface of the upper wall. The condensed pure water drips, under the force of gravity, toward the lower end of the inclined housing to collect in the water collection tray.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
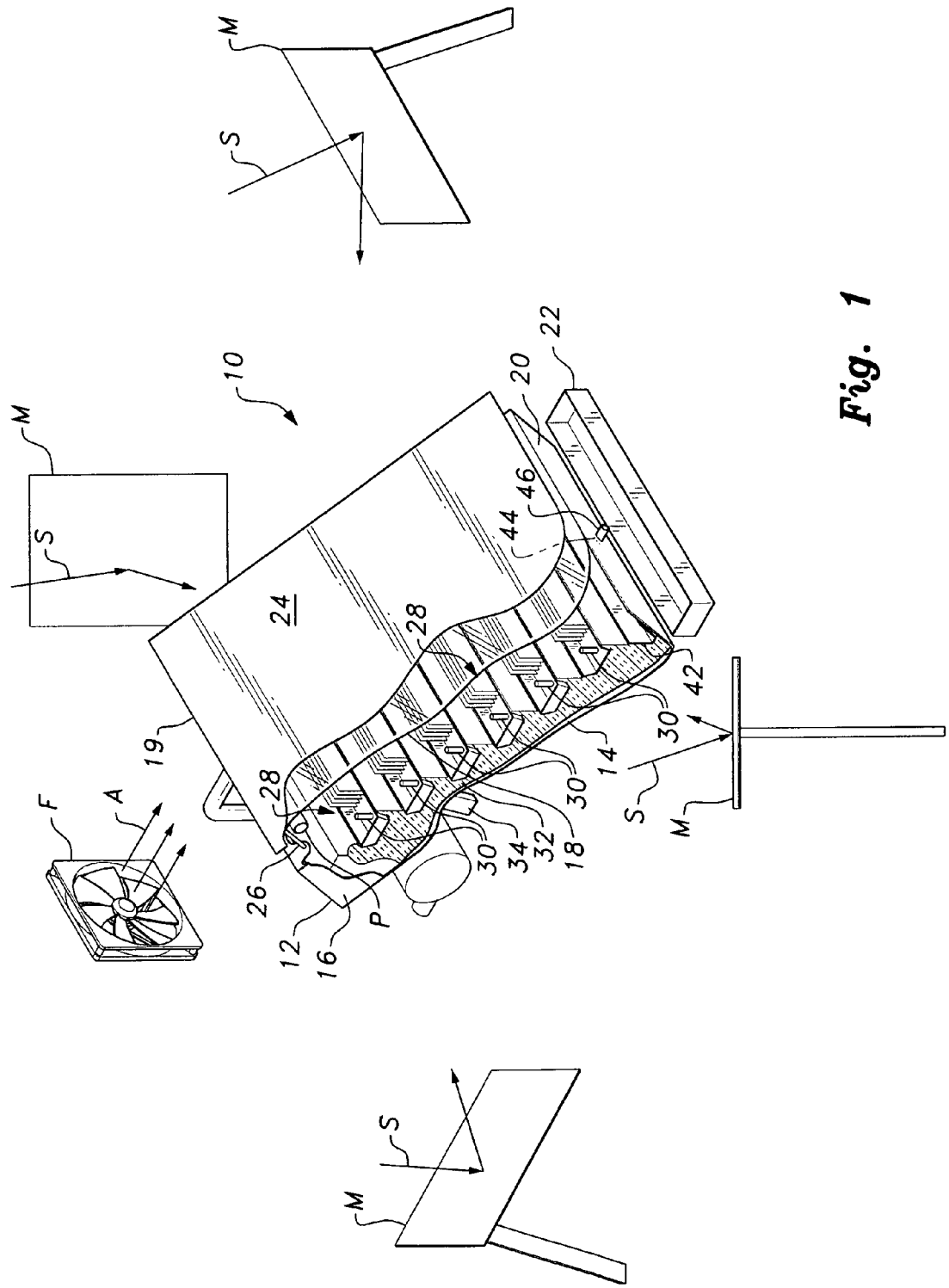
FIG. 1 is a schematic view of an evaporative desalination system according to the present invention, shown with the housing broken away to show details thereof.

The evaporative desalination system 10 removes salt and contaminants from brine or salt water W to produce purified potable water. The evaporative desalination system 10 includes an inclined housing 12 having a raised upper end 19 and a lower end 20. The inclined housing 12 defines a sealed open interior region therein. An upper wall 18 of the inclined housing 12 is formed from an optically transparent material, such as glass or the like.

As best shown in FIG. 1, the inclined housing 12 is preferably substantially rectangular, including a rectangular lower wall 14, four sidewalls 16 and a rectangular, optically transparent upper wall 18. It should be understood that the inclined housing 12 may have any desired shape or relative dimensions.

Figure 2:
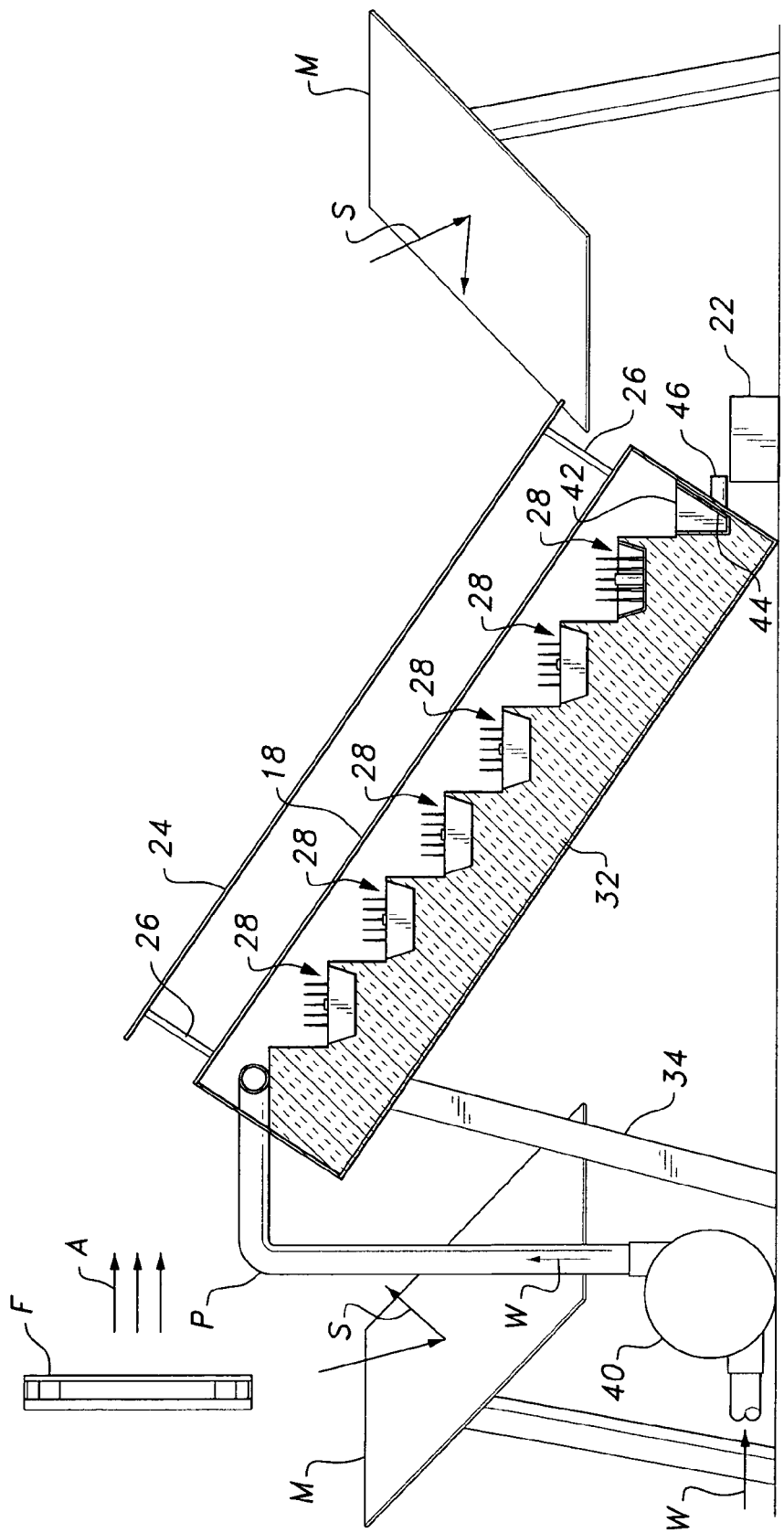
FIG. 2 is a diagrammatic side view of the evaporative desalination system according to the present invention.
Figure 3:
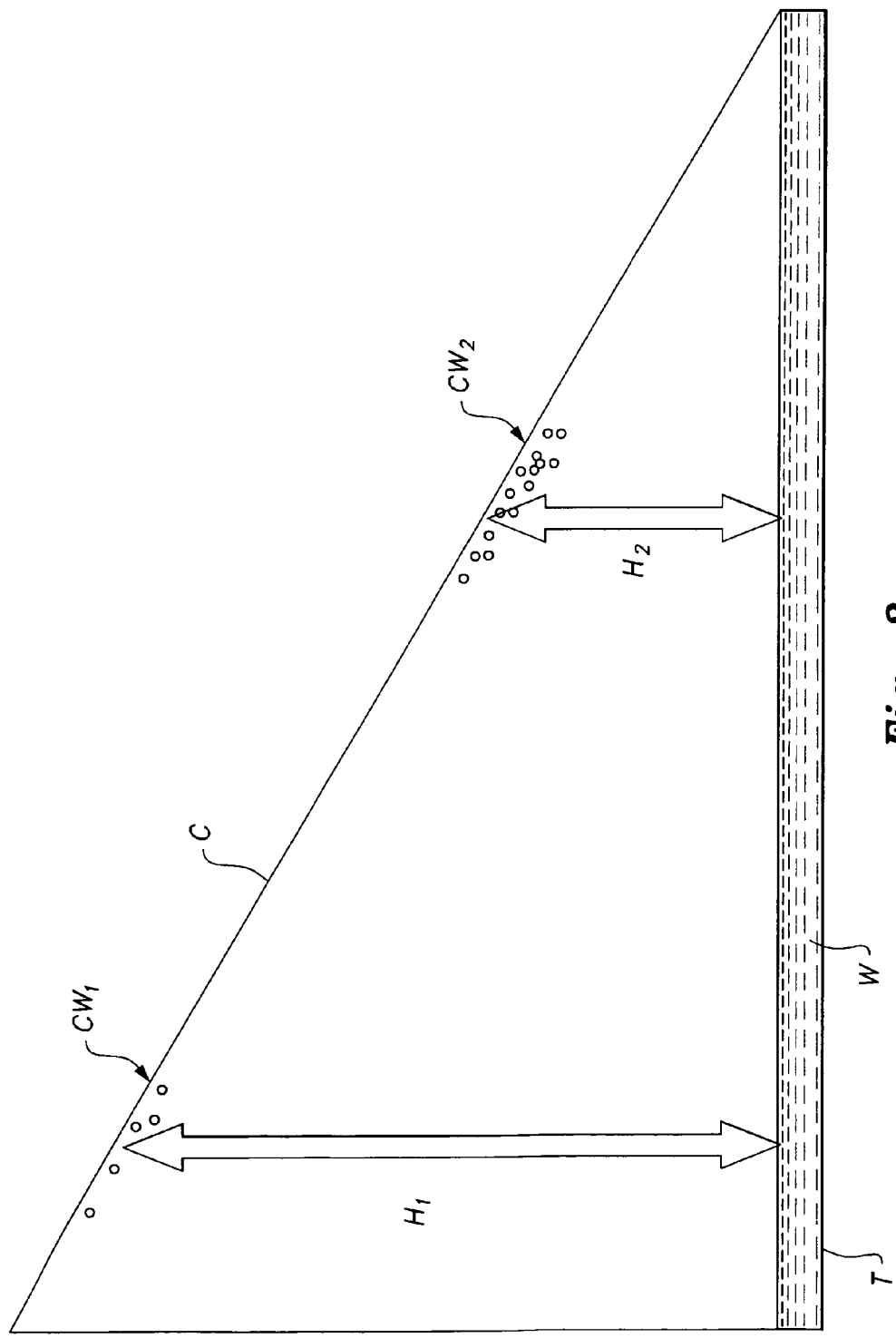
FIG. 3 is a diagrammatic view of a typical evaporative desalination system according to the prior art.

As shown in FIGS. 1 and 2, a stand 34 is preferably provided to raise the upper end 19 of the housing 12. The stand 34 has opposed upper and lower ends, with the lower end being adapted for mounting on the ground and the upper end supporting the raised upper end 19 of the inclined housing 12. Although shown as a single support rod, it should be understood that any suitable type of stand may be used to maintain the housing 12 in an inclined position. The stand 34 is preferably adjustable, allowing both the positioning and angle of inclination of housing 12 to be adjusted, depending upon geographical location and the time of day, in order to maximize exposure to sunlight S.

A plurality of stepped evaporator trays 28 are mounted within the inclined housing 12 so that the vertical distance between each evaporator tray 28 and the inner surface of the upper wall 18 is approximately equal (best shown in FIG. 2), i.e., the distance between the top of each tray 28 and the portion of the upper wall directly above it defines a median height, the median height for each tray being substantially equal. A water collection tray 42 is disposed within the inclined housing 12 adjacent the lower end 20. As best shown in FIGS. 1 and 2, a layer of insulating material 32 is preferably formed between the bottom of each evaporator tray 28 and the lower wall 14 of the inclined housing 12, as well as between and the collection tray 42 and the lower wall 14 of the inclined housing 12. It should be understood that any suitable thermal insulation material 32 may be used.

Figure 4:
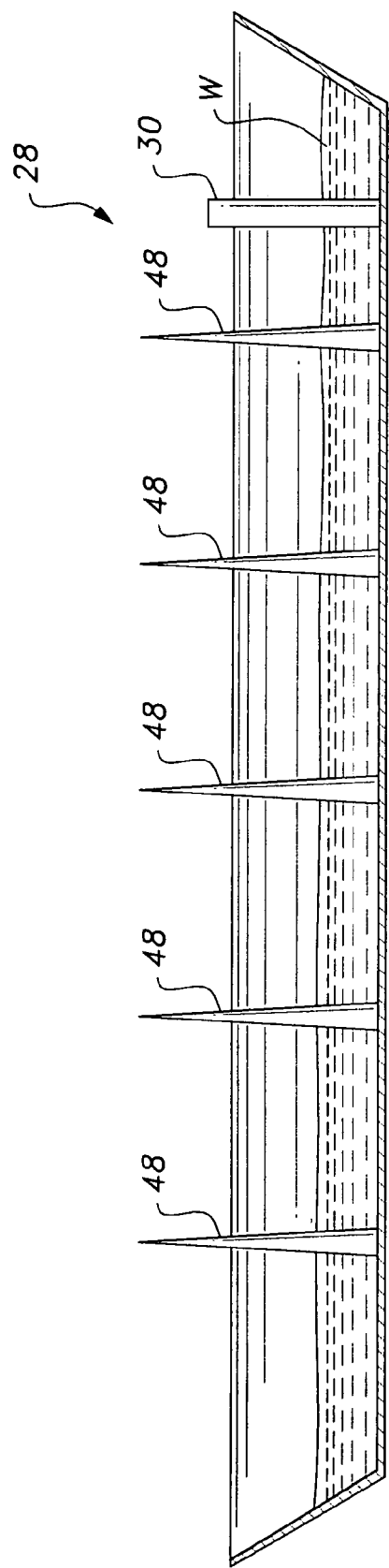
FIG. 4 is a side view in section of an evaporator tray of the evaporative desalination system of FIG. 1.

Each evaporator tray 28 is preferably formed from a thermally conductive material that will not corrode in the presence of the salt water or brine W, such as stainless steel or the like. As best shown in FIG. 4, an electrical heating element 30 is preferably mounted within each evaporator tray 28, allowing for selective heating of the tray 28 to heat the salt water or brine W contained therein. Additionally, at least one evaporator fin 48 may extend laterally within each evaporator tray 28. The evaporator fins 48 are also formed from thermally conductive material, thus increasing the heated surface area in contact with the brine or salt water W.

In FIG. 4, five such triangular fins 48 are shown, although, it should be understood that this configuration is shown for exemplary purposes only, and any desired number of evaporator fins 48 may be mounted within each evaporator tray 28. Each evaporator fin 48 may have any desired shape and relative dimensions, and may be formed from any suitable thermally conductive material. Similarly, when viewed in cross section, each tray 28 preferably has a substantially trapezoidal shape, but it should be understood that the evaporator trays 28 may have any desired relative dimensions and configuration. The layer of insulation 32 prevents thermal loss from the trays 28 to the housing 12.

As shown in FIG. 2, an external pump 40, which is selectively actuated, is positioned adjacent the inclined housing 12 for selectively feeding the brine or salt water W from an external source into the evaporator trays 28. A feed pipe P is connected at one end to the pump 40. The other end of the pipe P feeds the brine or salt water W into the open interior region of the inclined housing 12 to selectively fill the evaporator trays 28. Any suitable type of water distribution system may be used to fill each evaporator tray 28, such a secondary line or conduit extending from the pipe P directly into each tray 28, or, alternatively, allowing the salt water W to fill the topmost tray and then drip into the next adjacent tray and so on until the last tray is filled. Any suitable water distribution system may be used to selectively fill each evaporator tray 28 with the brine or salt water W supplied by the pump 40 via the feed pipe P.

As shown in FIGS. 1 and 2, a drain 44 is formed through the collection tray 42. As the collection tray 42 fills with purified potable water, it may be drained from the collection tray 42 through a drainage pipe 46 and into an external collection tank 22 for storage and distribution thereof.

In use, ambient light, such as sunlight S, is transmitted through the optically transparent upper wall 18 of inclined housing 12, causing the salt water W contained within the plurality of stepped evaporator trays 28 to heat and evaporate. Additional heating may be provided by heating elements 30, if necessary. Evaporated water vapor rises from each evaporator tray 28 to form a layer of condensed pure water on the inner surface of the upper wall 18. The condensed pure water drips, under the force of gravity, toward the lower end 20 of the inclined housing 12 to collect in the water collection tray 42, where it is then drained into the external collection tank 22.

In order to increase the output of purified water, the interior of the inclined housing 12 may be further heated by reflected sunlight S, which is reflected and focused by at least one mirror M positioned adjacent the housing 12 (as shown in FIG. 1). It should be understood that any desired number of mirrors M may be used, and the mirrors M may have any desired configuration, for example, concave focusing mirrors.

Additionally, the upper wall 18 may be cooled by the any suitable type of selective cooler or chiller to enhance condensation. For example, an optically transparent cover 24 may be removably mounted above the upper wall 18. The cover 24 is preferably formed from glass or the like, and is dimensioned and configured substantially identical to the upper wall 18. The cover 24 extends substantially parallel to the upper wall 18. Exemplary spacers 26 are shown in FIGS. 1 and 2, although it should be understood that any suitable type of support may be used for removably mounting the cover 24 above the upper wall 18 to form an airflow path therebetween.

A fan F, or any other suitable type of selective air blower, is positioned adjacent the upper end 19 of inclined housing 12 to selectively blow air A through the airflow path defined between the cover 24 and the upper wall 18, thus cooling the upper wall 18 to increase the output of condensed, purified water.

Figure 5:
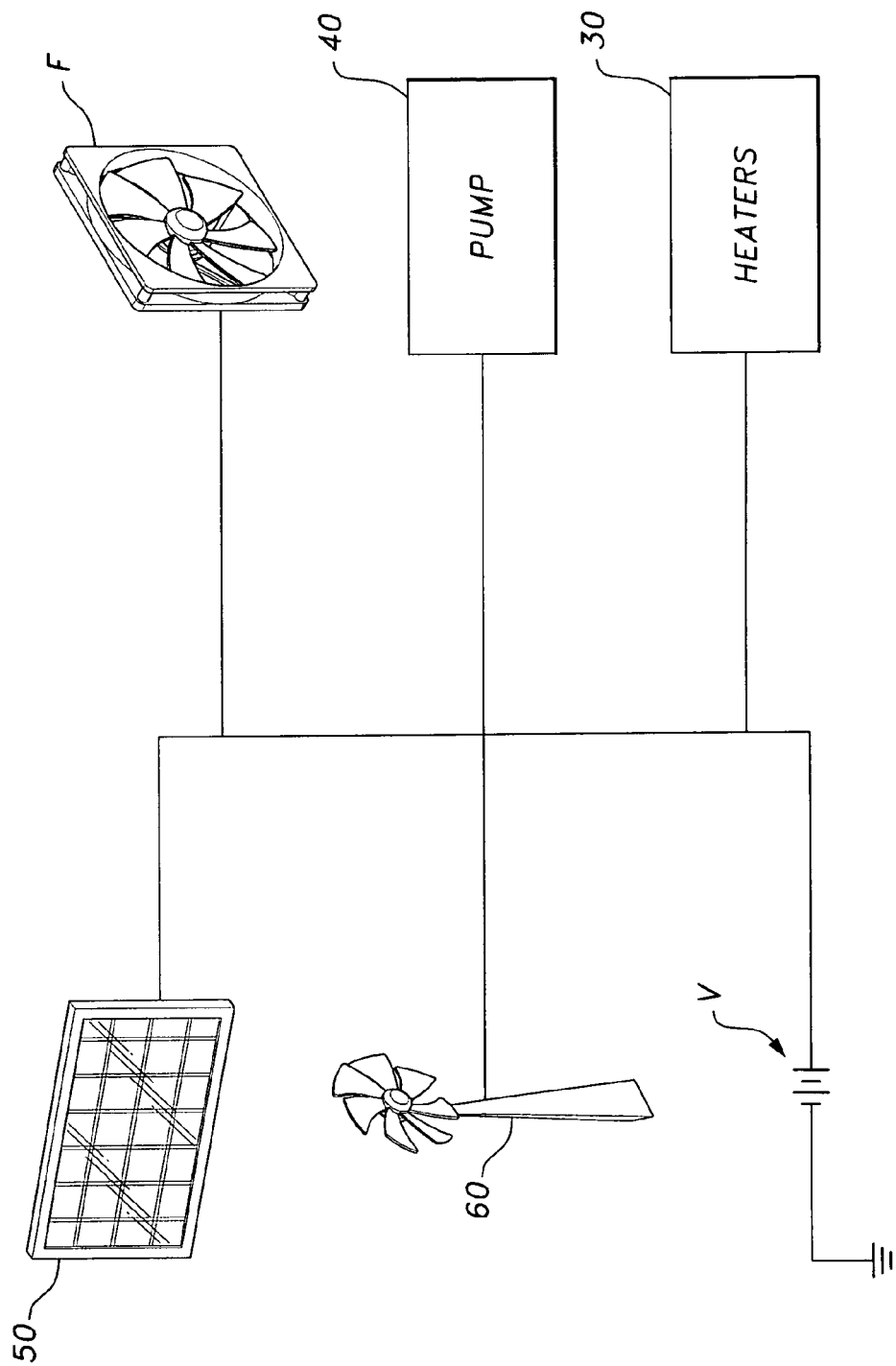
FIG. 5 is a diagrammatic view of the electrical connections for components of the evaporative desalination system of FIG. 1.
Figure 6:
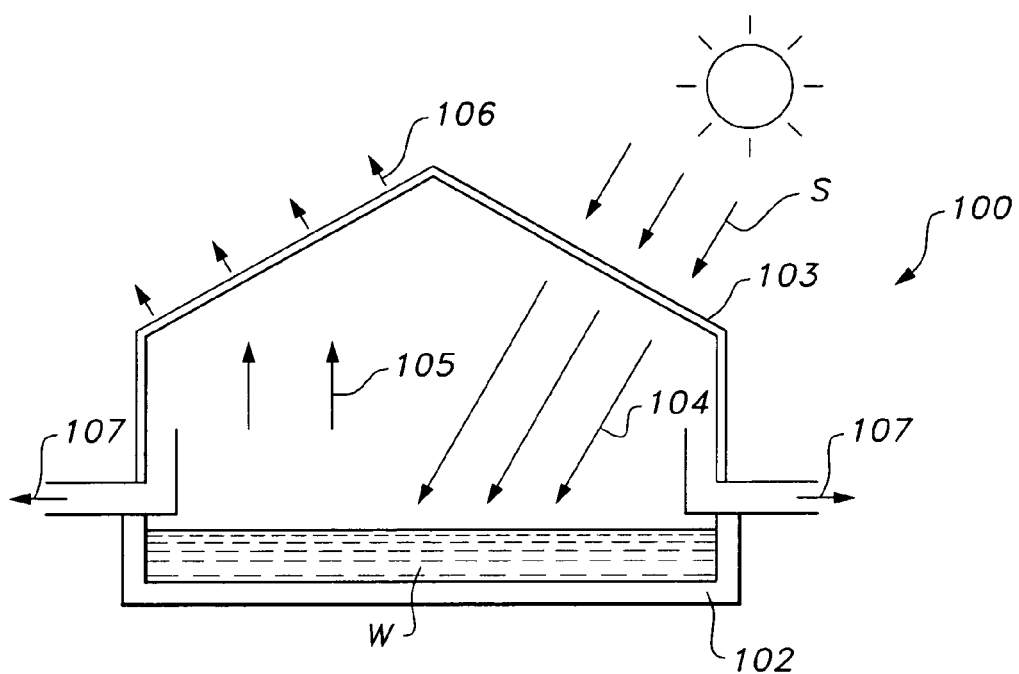
FIG. 6 is a diagrammatic view of a typical evaporative water desalination system according to the prior art.

As shown in FIG. 5, the fan F, the pump 40 and the heating elements 30 may be powered by any suitable external power supply, such as a standard electrical supply V, at least one wind turbine 60 positioned adjacent housing 12, at least one solar panel 50 positioned adjacent housing 12, or any desired combination thereof. The standard electrical supply V may be in the form of one or more batteries, which are at least partially charged by wind turbine 60 and/or at least one solar panel 50.

It is to be understood that the present invention is not limited to the embodiments described above, but encompasses any and all embodiments within the scope of the following claims.

We claim:

1. An evaporative desalination system, comprising:
an inclined housing having a raised upper end and a lower end, the inclined housing defining a sealed open interior region therein, the housing having an optically transparent upper wall, wherein said inclined housing includes a lower wall and at least one sidewall;
a stand having opposed upper and lower ends, the upper end supporting the raised upper end of said inclined housing;
a plurality of stepped evaporator trays mounted within the inclined housing, the median height between each of the trays and the upper wall being substantially equal, wherein each said evaporator tray is formed from a thermally conductive material and includes means for selectively heating each said evaporator tray;
a plurality of thermally conductive fins mounted within each of said stepped evaporator trays and extending substantially laterally across the corresponding one of the stepped evaporator trays;
a water collection tray disposed within the inclined housing adjacent the lower end thereof;
an insulating layer formed between said plurality of evaporator trays and the lower wall of said inclined housing, and between said water collection tray and the lower wall of said inclined housing; and
means for selectively filling the plurality of stepped evaporator trays with salt water;
wherein ambient light transmitted through the optically transparent upper wall causes the salt water contained within the plurality of stepped evaporator trays to evaporate and thereafter when condensed will drip, under the force of gravity toward the lower end of the inclined housing to collect in the water collection tray.

2. The evaporative desalination system as recited in claim 1, wherein said inclined housing is substantially rectangular in cross section.

3. The evaporative desalination system as recited in claim 1, wherein said means for selectively filling said plurality of stepped evaporator trays with the salt water includes a selectively-actuatable pump in communication with an external source of salt water.

4. The evaporative desalination system as recited in claim 3, wherein said water collection tray has a drain formed therethrough.

5. The evaporative desalination system as recited in claim 4, further comprising:
   a drainage pipe having first and second ends, the first end of the pipe being in communication with the drain formed through the water collection tray; and
   an external water collection tank, the second end of the drainage pipe being configured for feeding the condensed pure water thereto.

6. The evaporative desalination system as recited in claim 5, further comprising at least one mirror positioned adjacent said inclined housing for reflecting the ambient light into said inclined housing.

7. The evaporative desalination system as recited in claim 6, further comprising means for selectively cooling the upper wall of said inclined housing.

8. The evaporative desalination system as recited in claim 7, further comprising an optically transparent cover positioned above and extending parallel to the upper wall of said inclined housing, forming an airflow pathway between the cover and the upper wall of said housing.

9. The evaporative desalination system as recited in claim 8, further comprising a fan disposed at one end of the airflow pathway for blowing ambient air through the airflow pathway, the fan being selectively operable.

10. The evaporative desalination system as recited in claim 9, wherein said means for selectively heating each said evaporator tray comprises a plurality of electric heating elements, the heating elements being disposed within each said evaporator tray, respectively.

11. The evaporative desalination system as recited in claim 10, further comprising at least one solar panel positioned adjacent said inclined housing, the solar panel being electrically connected to the plurality of electric heating elements, the fan and the pump for at least partially powering the plurality of electric heating elements, the fan and the pump.

12. The evaporative desalination system as recited in claim 10, further comprising at least one wind turbine positioned adjacent said inclined housing, the wind turbine being electrically connected to the plurality of electric heating elements, the fan and the pump for at least partially powering the plurality of electric heating elements, the fan and the pump.

13. The evaporative desalination system as recited in claim 10, further comprising:
   at least one solar panel positioned adjacent said inclined housing; and
   at least one wind turbine in electrical communication with the at least one solar panel and being positioned adjacent said inclined housing, the wind turbine and the at least one solar panel being electrically connected to the plurality of electric heating elements, the fan and the pump for at least partially powering the plurality of electric heating elements, the fan and the pump.

14. The evaporative desalination system as recited in claim 10, further comprising a feed pipe having opposed first and second ends, the first end being in communication with the pump, the second end feeding into the open interior region of said inclined housing, the feed pipe being configured to deliver the salt water to said plurality of evaporator trays.

15. An evaporative desalination system, comprising:
   an inclined housing having a raised upper end and a lower end, the inclined housing defining a sealed open interior region therein, the housing having an optically transparent upper wall, the inclined housing includes a lower wall and a pair of sidewalls;
   a stand having opposed upper and lower ends, the upper end supporting the raised upper end of the inclined housing;
   a plurality of stepped evaporator trays mounted within the inclined housing, the median height between each of the trays and the optically transparent upper wall being substantially equal, wherein each said evaporator tray is formed from a thermally conductive material and includes means for selectively heating each said evaporator tray;
   at least one thermally conductive fin mounted within each of the stepped evaporator trays;
   a water collection tray disposed within the inclined housing adjacent the lower end thereof;
   an insulating layer formed between said plurality of evaporator trays and the lower wall of the inclined housing; and
   means for selectively filling the plurality of stepped evaporator trays with salt water.

\* \* \* \* \*